United States Patent [19]

Hirt et al.

[11] Patent Number: 4,618,356
[45] Date of Patent: Oct. 21, 1986

[54] MOVING MEANS FOR USE IN A GLASSWARE MANUFACTURING MACHINE

[75] Inventors: Walter Hirt, Buelach; Fritz Futterknecht, Zurich, both of Switzerland

[73] Assignee: Emhart Industries, Inc., Farmington, Conn.

[21] Appl. No.: 790,558

[22] Filed: Oct. 23, 1985

[30] Foreign Application Priority Data

Oct. 27, 1984 [GB] United Kingdom ............... 8427221

[51] Int. Cl.⁴ .............................................. C03B 9/40
[52] U.S. Cl. ........................................ 65/173; 65/68; 65/167; 65/241; 65/260; 65/261; 65/300
[58] Field of Search .................. 65/68, 167, 173, 235, 65/241, 260, 300, 261

[56] References Cited

U.S. PATENT DOCUMENTS

| | | | |
|---|---|---|---|
| 1,747,438 | 2/1930 | Hillmann | 65/173 X |
| 2,084,285 | 6/1937 | Wadman | 65/230 |
| 2,994,986 | 8/1961 | Rowe | 65/235 |
| 3,607,174 | 9/1971 | Patrick | 65/167 |
| 4,004,905 | 1/1977 | Mumford | 65/261 |

Primary Examiner—Arthur Kellogg
Attorney, Agent, or Firm—H. Samuel Kieser

[57] ABSTRACT

An operative member such as a blowhead (10) is moved between an out-of-the-way position thereof and an operative position thereof by moving means which comprises a vertical shaft (15), means for moving the shaft vertically and turning it about a vertical axis (14), and a support (18) for the operative member clamped to the shaft. The support (18) comprises an arm (20) on which the member is mounted and clamping means (30,34,38,40) to clamp the support to the shaft. Complementarily-shaped camming surfaces (22 and 36) of the shaft and the support urge the support into the correct orientation with respect to the shaft.

9 Claims, 2 Drawing Figures

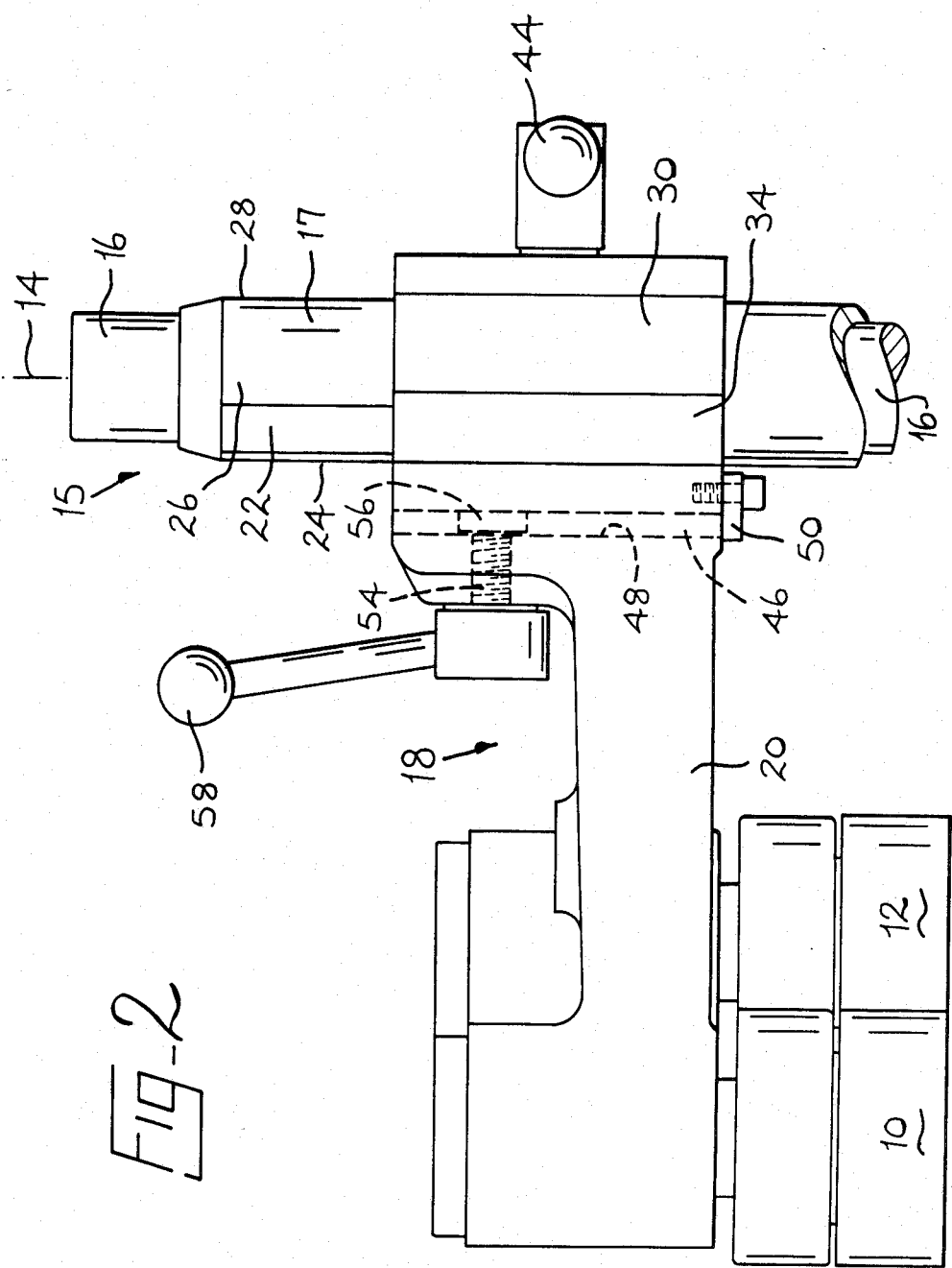

MOVING MEANS FOR USE IN A GLASSWARE MANUFACTURING MACHINE

BACKGROUND OF THE INVENTION

This invention is concerned with moving means for use in a glassware manufacturing machine for moving an operative member such as a funnel, a baffle or a blowhead.

In a glassware manufacturing machine of the so-called "individual section" type, it is necessary to move operative members between out-of-the-way positions thereof out of alignment with an opening of a cavity of a mould of the machine and operative positions thereof in which the operative member is in alignment with the opening of the cavity and in close proximity thereto. For example, each section of the machine comprises a blank mould in which parisons are formed from gobs of molten glass by either a pressing or a blowing operation and it is necessary to move a funnel into alignment with the mould opening so that the funnel can guide a gob into the mould cavity. The funnel is then moved to an out-of-the-way position thereof to allow a baffle to close the mould cavity opening. The baffle is moved in a similar manner to the funnel in relation to the blank mould and a blowhead through which air is blown into the mould is moved in a similar manner but in relation to a finish mould of the section in which parisons transferred to the finish mould from the blank mould are blown into articles of glassware.

Conventional moving means for moving the funnel, baffle and blowhead of a machine of the individual section type operates in a similar manner in each case. The moving means comprises a vertically-disposed piston and cylinder assembly having a piston with two integral piston rods. One piston rod extends vertically-upwards providing a vertically-extending shaft on which a support for the operative member is mounted for movement with the shaft. The other piston rod extends vertically downwards and carries a cam follower which engages a cam track shaped so that, during part of the movement of the piston along the cylinder, it is caused to turn so that the first-mentioned piston rod turns about a vertical longitudinal axis thereof. The support for the operative member comprises an arm which extends horizontally and on which the operative member is mounted and clamping means by which the support is clamped to the vertically-extending shaft so that the support moves with the shaft. The arrangement is, thus, such that movement of the piston causes the upwardly-extending piston rod to move vertically and to turn about its longitudinal axis so that the operative member makes a movement which has a rotary component about a vertical axis and a linear component in a vertical direction, the linear component moves the operative member towards or away from the opening of the mould cavity while the rotary component moves it into or out of alignment with the opening.

The vertically-extending shaft of the moving means for an operative member of a conventional machine is cylindrical and the clamping means acts to force two semi-circular gripping surfaces arranged on opposite sides of the shaft into gripping engagement with the shaft. This arrangement enables the support to be clamped to the shaft in any orientation but this is undesirable as the arm must extend away from the shaft in precisely the correct orientation if the operative member is to align correctly with the mould cavity opening. Thus, when an operative member has to be changed either because of wear or because the machine is being changed to manufacture a different article, considerable time is spent in correctly orientating the support relative to the shaft before clamping it thereto. This time causes lost production of considerable proportions especially when it is recalled that, in each section, this problem occurs with the baffle, the blowhead and the funnel. A typical machine has 6 sections so that the problem occurs 18 times when a job change is made and machines with 8 or 10 sections are not uncommon.

It is an object of the present invention to provide moving means of the type described in which the support can be more rapidly orientated relative to the shaft than in the conventional moving means described above.

BRIEF SUMMARY OF THE INVENTION

The invention provides moving means for use in a glassware manufacturing machine for moving an operative member between an out-of-the-way position thereof and an operative position thereof in alignment with an opening of a cavity of a mould of the machine, the operative member making a movement which has a rotary component about a vertical axis and a linear component in a vertical direction, the moving means comprising a vertically-extending shaft, a support for the operative member comprising a horizontally-extending arm on which the operative member is mounted and clamping means by which the support is clamped to the vertically-extending shaft so that the support moves with the shaft, and means operable to move the shaft longitudinally thereof and to turn the shaft about a vertical axis thereof to thereby move the operable member vertically and about the vertical longitudinal axis of the shaft, wherein the shaft and the support are provided with complementarily-shaped camming surfaces which, when in engagement with one another, force the support into a particular orientation with respect to the shaft, the particular orientation being the correct orientation for the support on the shaft.

With moving means according to the last preceding paragraph, when the support is mounted on the vertically-extending shaft, the engagement of the camming surfaces forces the support into its correct orientation. Thus, no time need be spent on ensuring that the orientation is correct.

With conventional moving means, time is also lost in bringing the support to the correct height relative to the shaft before clamping the support to the shaft. This time can be reduced, when the replacement operative member has to be at the same relative height as the replaced operative member, if the arm of the support is detachably mounted on the clamping means thereof. In this case, the operative member and the arm on which it is mounted can simply be detached from the clamping means and an identical arm with the new operative member mounted thereon can be attached in its place. The height of the arm relative to the clamping means can be determined by a stop. The stop ensures that the replacement arm is at the same height relative to the clamping means as the replaced arm and the height relative to the shaft is unaltered as the clamping means has retained its height relative to the shaft. The stop may be adjustable heightwise. If the height of the support has to be changed because of a job change, the time taken can be reduced, in some cases, if a scale is mounted on the shaft so that the height of the support can be adjusted to a selected scale reading. In this case, if the particular job has been previously carried out and the scale readings recorded, the supports can be adjusted to the recorded readings. Alternatively, once the correct heights of the supports of one section have been established scale readings can be taken from that section and the supports of the other sections adjusted to the same scale readings.

In order to enable the vertically-extending shafts of conventional moving means to be adapted for use in moving means according to the invention, the camming surfaces of the shaft may be provided on a sleeve portion of the shaft which fits over a cylindrical rod portion of the shaft and is keyed thereto to prevent the sleeve portion from turning relative to the rod portion. Thus, the cylindrical upwardly-extending piston rod of a conventional moving means can be adapted by fitting a sleeve over a rod and keying it to the rod.

Conveniently, the camming surfaces of the shaft are provided by two flat surface portions inclined to one another at an angle of between 60° and 120°. At 60° the shaft can be substantially triangular and at 120° substantially hexagonal. The camming surfaces may be provided by a projection on the shaft or support entering a recess in the other, e.g. a spline entering a groove.

BRIEF DESCRIPTION OF THE DRAWINGS

There now follows a detailed description, to be read with reference to the accompanying drawings, of moving means for use in a glassware manufacturing machine which is illustrative of the invention. It is to be understood that the illustrative moving means has been selected for description by way of example and not of limitation of the invention.

In the drawings:

FIG. 2 is a side elevational view of the support shown in FIG. 1 taken in the direction of the arrow II in FIG. 1.

DETAILED DESCRIPTION OF PREFERRED EMBODIMENT OF THE INVENTION

Figure 1:
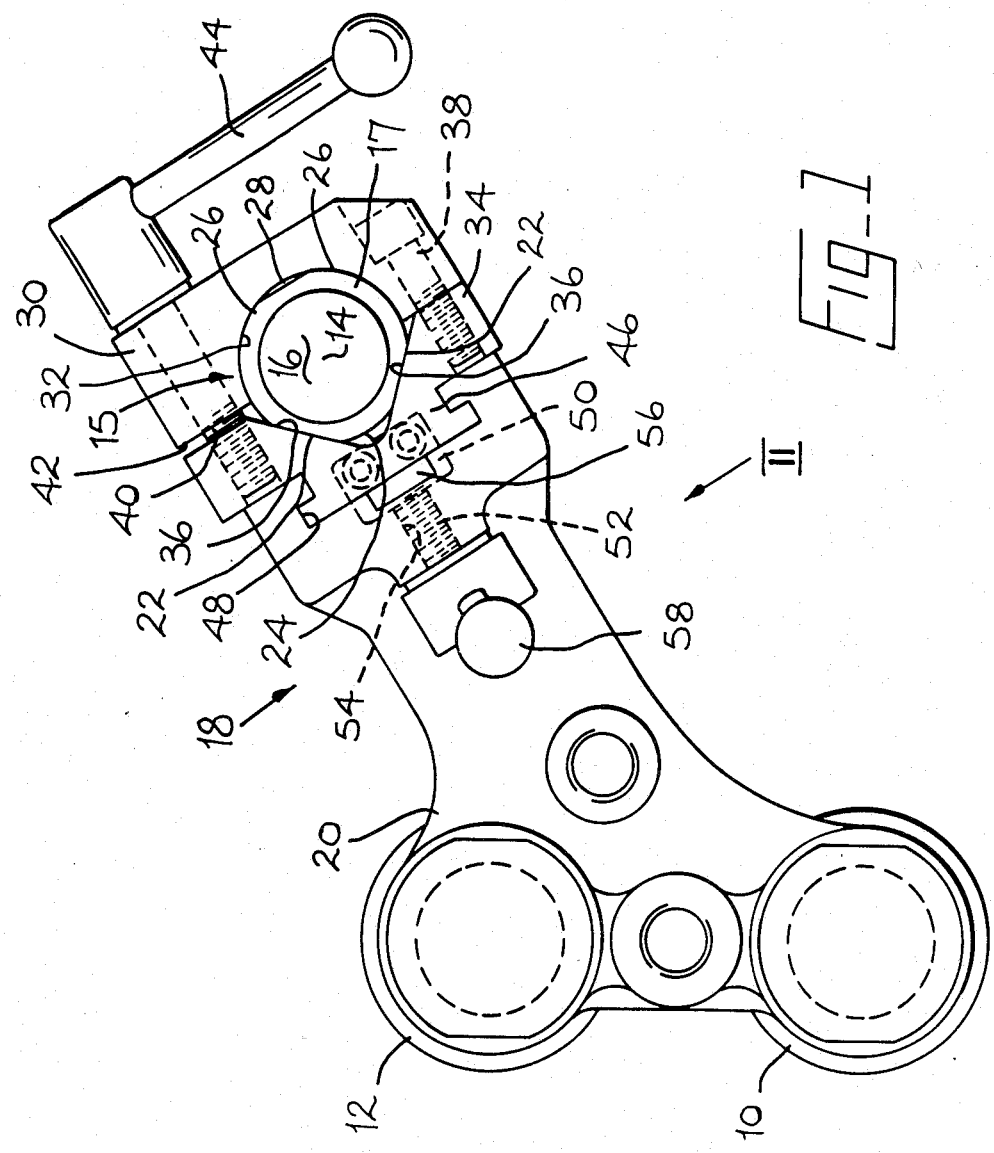
FIG. 1 is a plan view of a support of the illustrative moving means.

The illustrative moving means is for use in a glassware manufacturing machine of the individual section type for moving a blowhead 10 and a further blowhead 12. The blowhead 10 is moved between an out-of-the-way position thereof and an operative position thereof in alignment with an opening of a cavity of a finish mould of the machine (not shown) in which parisons are blown into articles of glassware by air supplied from the blowhead 10. The movement of the blowhead 10 also moves the blowhead 12 between an operative position thereof in alignment with an opening of a cavity of a further finish mould of the machine. The blowhead 10 makes a movement which has a rotary component about a vertical axis 14 and a linear component in a vertical direction.

The illustrative moving means comprises a vertically-extending shaft 15 which extends along the axis 14. The shaft 15 comprises a cylindrical rod portion 16, which extends vertically with its longitudinal axis along the axis 14, and a sleeve portion 17 which fits over the rod portion 16 and is keyed thereto by a key (not shown) to prevent the sleeve portion 17 from turning relative to the rod portion 16. A support 18 for the blowheads 10 and 12 of the illustrative moving means comprises a horizontally-extending arm 20 on which the blowheads are mounted and clamping means by which the support 18 is clamped to the vertically-extending shaft 16 so that the support moves with the shaft.

The illustrative moving means also comprises means of conventional construction operable to move the shaft 15 longitudinally thereof along the axis 14 and to turn the shaft 15 about the vertical axis 14 thereof to thereby move the blowheads 10 and 12 between their out-of-the-way and operative positions by moving them vertically and about the axis 14. This means comprises a vertically-disposed piston and cylinder assembly (not shown) having a piston with two integral piston rods, one of which being the rod portion 16 of the shaft 15. The other piston rod (not shown) extends downwards along the axis 14 and carries a cam follower which engages a cam track shaped so that, during part of the movement of the piston along the cylinder, it is caused to turn about the axis 14. Thus, in the operation of the piston and cylinder assembly, the shaft 15 is moved vertically and turned about the axis 14 moving the blowheads 10 and 12 as aforesaid.

The sleeve portion 17 has an external surface which has two flat camming surfaces 22 inclined to one another at an angle of 90° and separated by a short surface 24 which is arcuate about the axis 14. The external surface of the sleeve portion 17 has two further arcuate surfaces 26 separated by a flat surface 28 which extend between the flat surfaces 22.

The clamping means of the support 18 comprises two opposed clamping members, a first clamping member 30 having an arcuate surface 32 which is complementary to the surfaces 26 of the shaft 15 and a second clamping member 34 which has two camming surfaces 36 which are complementary to the camming surfaces 22 of the shaft 15, i.e. they are inclined at 90° to one another. The clamping means also comprises two bolts 38 and 40 which secure the clamping members 30 and 34 around the sleeve portion 17 of the shaft 15. The bolt 38 is of conventional construction and secures the clamping members 30 and 34 in intimate contact on one side of the shaft 15. The bolt 40 acts on the opposite side of the shaft 15 to the bolt 38 to control the width of a small gap 42 between the clamping members 30 and 34. The bolt 40 has a handle 44 by which it can be tightened to clamp the members 30 and 34 against movement on the shaft 15 or loosened to allow the members 30 and 34 to slide vertically along the shaft 15. Tightening the bolt 40 causes the complementarily-shaped surfaces 22 and 36 to be urged together. These surfaces 22 and 36 act as camming surfaces which force the clamping members 30 and 34 and hence the support 18 into a particular orientation with respect to the shaft 15. The particular orientation is the correct orientation for the support 18 on the shaft 15 and is selected by the orientation of the sleeve portion 17 on the rod portion 16.

The clamping member 34 has a T-shaped projection 46 extending therefrom. The arm 18 has a slot 48 of complementary shape to the projection 46 and arranged to fit over the projection. A stop 50 projects from the clamping member 34 at the bottom of the projection 46 and serves to determine the height of the arm 20 relative to the clamping means. A bolt 52 is threadedly-received in a bore 54 in the arm 20 and carries a clamping plate 56 arranged to engage the projection 46 to secure the arm 20 against movement on the clamping member 34 and has a handle 58 by which it can be tightened or loosened. The arm 20 is thus detachably mounted on the clamping means of the support 18. The slot and projection connection gives the arm 20 a constant orientation with respect to the member 34. In modifications of the illustrative moving means, other forms of connection between the arm 20 and the clamping member 34 can be used e.g. a horizontal slideway may be provided into which the arm fits or the arm may fit over a vertically extending pin.

In the use of the illustrative moving means, the support 18 is moved to the required height on the shaft 15, in some cases with the aid of a scale (not shown) engraved on the surface 28. The handle 44 is used to tighten the bolt 40 so that the support 18 is clamped against movement relative to the shaft 15. As the bolt 40 is tightened using the handle 44, the surfaces 22 and 36 cam the support 18 into the correct orientation. When it is necessary to change the blowheads 10 and 12, if the height of the support 18 does not require to be altered, the bolt 52 is loosened using the handle 58 and the arm 20 with the blowheads 10 and 12 are removed. An identical arm 20 with replacement blowheads is attached to the clamping member 34 by sliding the slot 48 over the projection until the arm 20 engages the stop 50 and tightening the bolt 52.

We claim:

1. Moving means for use in a glassware manufacturing machine for moving an operative member between an out-of-the-way position thereof and an operative position thereof in alignment with an opening of a cavity of a mould of the machine, the operative member making a movement which has a rotary component about a vertical axis and a linear component in a vertical direction, the moving means comprising a vertically-extending shaft, a support for the operative member comprising a horizontally-extending arm on which the operative member is mounted and clamping means by which the support is clamped to the vertically-extending shaft so that the support moves with the shaft, and means operable to move the shaft longitudinally thereof and to turn the shaft about a vertical axis thereof to thereby move the operable member vertically and about the vertical longitudinal axis of the shaft, wherein the shaft and the support are provided with complementarily-shaped camming surfaces which, when in engagement with one another, force the support into a particular orientation with respect to the shaft, the particular orientation being the correct orientation for the support on the shaft.

2. Moving means according to claim 1, wherein the arm of the support is detachably mounted on the clamping means thereof.

3. Moving means according to claim 2, wherein a stop is arranged to determine the height of an arm relative to the clamping means.

4. Moving means according to claim 3, wherein the stop is adjustable heightwise.

5. Moving means according to claim 1, wherein a scale is mounted on the shaft so that the height of the support can be adjusted to a selected scale reading.

6. Moving means according to claim 1, wherein the camming surfaces of the shaft are provided on a sleeve portion of the shaft which fits over a cylindrical rod portion of the shaft and is keyed thereto to prevent the sleeve portion from turning relative to the rod portion.

7. Moving means according to claim 1, wherein the camming surfaces of the shaft are provided by two flat surface portions inclined to one another at an angle of between 60° and 120°.

8. Moving means according to claim 1, wherein the camming surfaces are provided by a spline on the shaft entering a groove in the support.

9. Moving means according to claim 1, wherein the camming surfaces are provided by a spline on the support entering a groove in the shaft.

* * * * *